Dec. 1, 1931.   W. A. CHRYST   1,833,987
REFRIGERATING APPARATUS
Filed Nov. 20, 1926
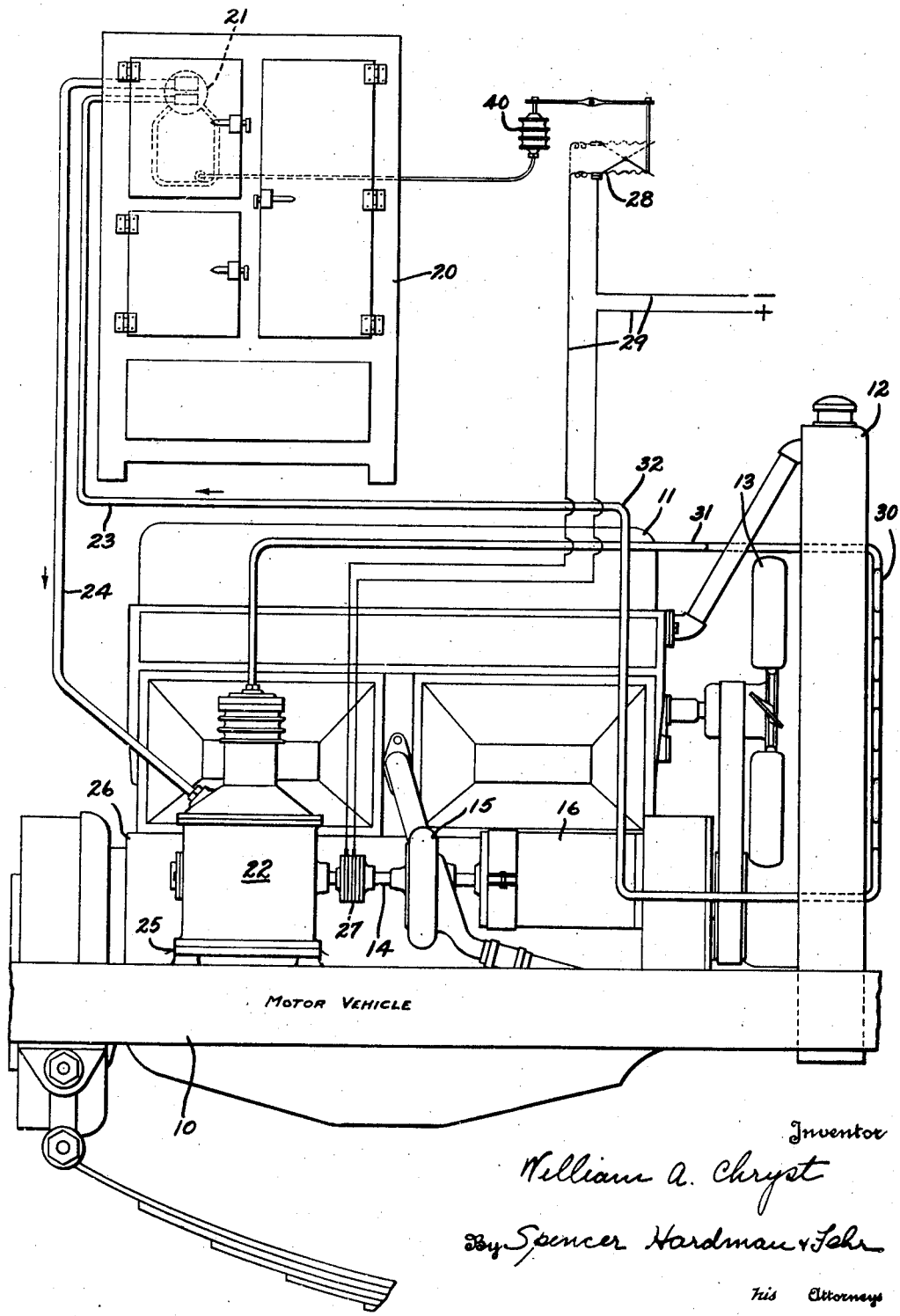

Patented Dec. 1, 1931

1,833,987

UNITED STATES PATENT OFFICE

WILLIAM A. CHRYST, OF DAYTON, OHIO, ASSIGNOR, BY MESNE ASSIGNMENTS, TO FRIGIDAIRE CORPORATION, A CORPORATION OF DELAWARE

REFRIGERATING APPARATUS

Application filed November 20, 1926. Serial No. 149,770.

This invention relates to refrigerating apparatus, particularly of the compressor-condenser-expander type as applied to motor vehicles.

One object of the invention is to provide improved means for refrigerating a motor vehicle.

Another of the objects is to provide means for furnishing the power for the refrigerating system from the engine which drives the vehicle.

Another object is to provide an improved means for cooling the condenser in such a system.

Other objects will appear in the accompanying description and drawing.

The single figure of the drawing shows a refrigerating apparatus mounted on a motor vehicle, certain parts of the system being diagrammatically illustrated.

In refrigerated motor vehicles, such as ice-cream and meat trucks, as heretofore constructed, it has been customary to mount a complete electrically driven mechanical refrigerating system in the body of the truck and also to mount in the body an electric generator driven by an internal combustion engine for supplying necessary current. The refrigerating system usually includes an electric motor for driving the compressor, and a fan for cooling the condenser. This arrangement is both bulky and heavy. One of the objects of my invention is to eliminate a large number of the parts of such a system, thus providing a lighter transportation equipment having increased capacity.

In the drawing, 10 represents a motor vehicle having the usual engine 11, radiator 12, fan 13, and shaft 14 for driving such auxiliaries as water pump 15, generator 16 and fan 13. The refrigerated compartment of the vehicle body is diagrammatically represented by the cabinet 20, cooled by an evaporator 21. A compressor 22 pumps liquid refrigerant to the evaporator through pipe 23 and withdraws gaseous refrigerant from the evaporator through pipe 24.

I mount the compressor in a position to be driven directly by the engine. One way of doing this is to support the compressor on a shelf or bracket 25, formed on or secured to the crank case 26 of the engine, in line with the shaft 14.

The compressor may be connected to and disconnected from the engine by a clutch 27. This may be of any suitable form, for example, a magnetic clutch arranged to engage the parts when a switch 28 is closed, and to disengage them when the switch is open. The switch is connected by conductors 29 to the clutch and any suitable source of current, such as the battery of the vehicle.

A condenser is required to cool the hot compressed gaseous refrigerant delivered by the compressor. This may be a serpentine coil 30 of tubing, connected to the compressor by pipe 31 and to the evaporator by pipe 32. In order to cool the condenser I place it in an exposed position where air currents caused by motion of the vehicle will pass over it. Preferably I place it adjacent the radiator so that air will be positively circulated over it by the fan 13 when the vehicle is not in motion.

The apparatus operates as follows: The elements of the refrigerating system proper operate in the usual and known manner, the condenser 30 being cooled by air currents which are induced by motion of the vehicle and/or by the fan 13. With the engine running, when the temperature in the refrigerated compartment rises to a predetermined point, a pressure or temperature responsive element 40 closes the switch 28 to engage the clutch 27. When the operation of the compressor has reduced the temperature to the desired point, the element 40 opens the switch 28 and disengages the clutch.

It will be understood that the invention is not limited to the particular details which have been selected for the sake of illustration merely, but includes modifications within the scope of the appended claims.

What is claimed is as follows:

1. In combination with an internal combustion engine having a radiator for cooling the cooling water of the engine, refrigerating apparatus including a condenser, and common means for forcing a cooling medium over the radiator and condenser.

2. In combination, a vehicle, an internal combustion engine mounted on said vehicle drivingly connected with said vehicle, said engine including a water cooling system having a radiator and a fan directly driven by the engine for forcing air through the radiator, a refrigerating compressor on said vehicle, a clutch drive between said engine and compressor, means confining a space to be refrigerated on said vehicle, a refrigerant evaporator in said space discharging to said compressor, a refrigerant condenser on said vehicle and disposed in the path of air circulated by said fan, said condenser receiving refrigerant from said compressor and delivering same to said evaporator, and means responsive to refrigeration conditions in said space controlling said clutch drive.

3. In combination, a vehicle, an internal combustion engine mounted on said vehicle drivingly connected with said vehicle, said engine including a water cooling system having a radiator at the point of said vehicle, a fan directly driven by the engine for forcing air through the radiator, a refrigerating compressor on said vehicle, a clutch drive between said engine and compressor, means confining a space to be refrigerated on said vehicle, a refrigerant evaporator in said space discharging to said compressor, a refrigerant condenser on said vehicle and disposed in the path of air circulated by said fan, said condenser receiving refrigerant from said compressor and delivering same to said evaporator, and means responsive to refrigeration conditions in said space controlling said clutch drive.

4. In combination, a vehicle, an internal combustion engine mounted on said vehicle drivingly connected to said vehicle, said engine including a water cooling system having a radiator and fan at the front of said vehicle, a refrigerant compressor on said vehicle, a clutch drive between said engine and said compressor, means confining a space to be refrigerated on said vehicle, a refrigerant evaporator in said space discharging to said compressor, a refrigerant condenser on said vehicle adjacent said radiator and fan and cooled by air currents induced by said fan and receiving refrigerant from said compressor and delivering the same to the evaporator, means responsive to refrigeration conditions in said space controlling said clutch drive.

5. In combination, a vehicle, an internal combustion engine mounted on said vehicle drivingly connected to said vehicle, said engine including a water cooling system having a radiator and fan at the front of said vehicle, a refrigerant compressor on said vehicle, a magnetically controlled clutch drive between said engine and said compressor, means confining a space to be refrigerated on said vehicle, a refrigerant evaporator in said space discharging to said compressor, a refrigerant condenser on said vehicle adjacent said radiator and fan and cooled by air currents induced by said fan and receiving refrigerant from said compressor and delivering the same to the evaporator, means responsive to refrigeration conditions in said space controlling electrical energy for said magnetic clutch drive.

In testimony whereof I hereto affix my signature.

WILLIAM A. CHRYST.